Dec. 5, 1933.  A. W. GREEN  1,938,222
TOOTH GUIDE
Filed Nov. 22, 1932  2 Sheets-Sheet 1
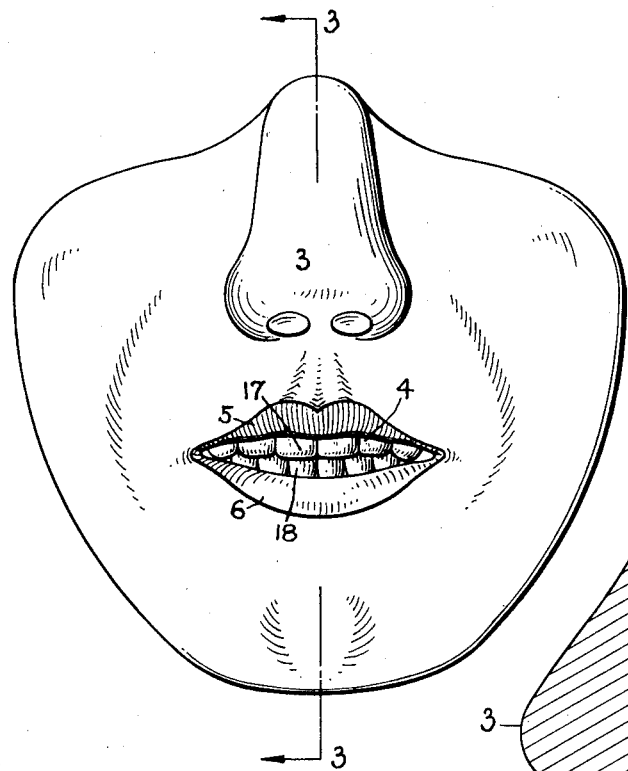
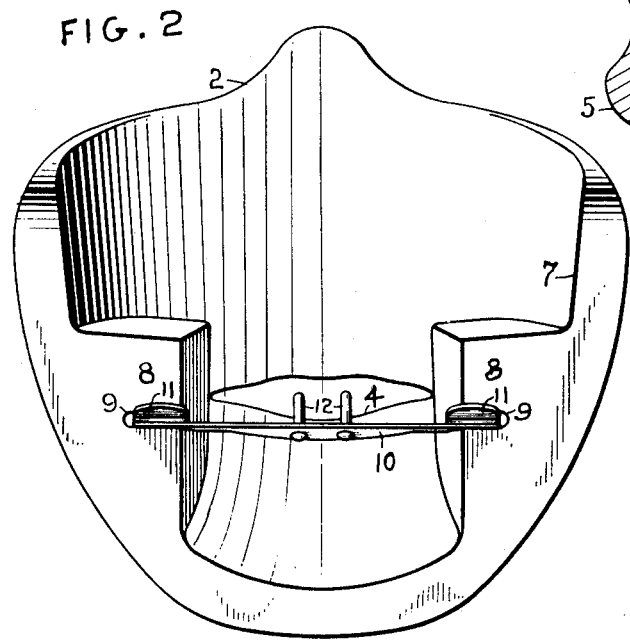
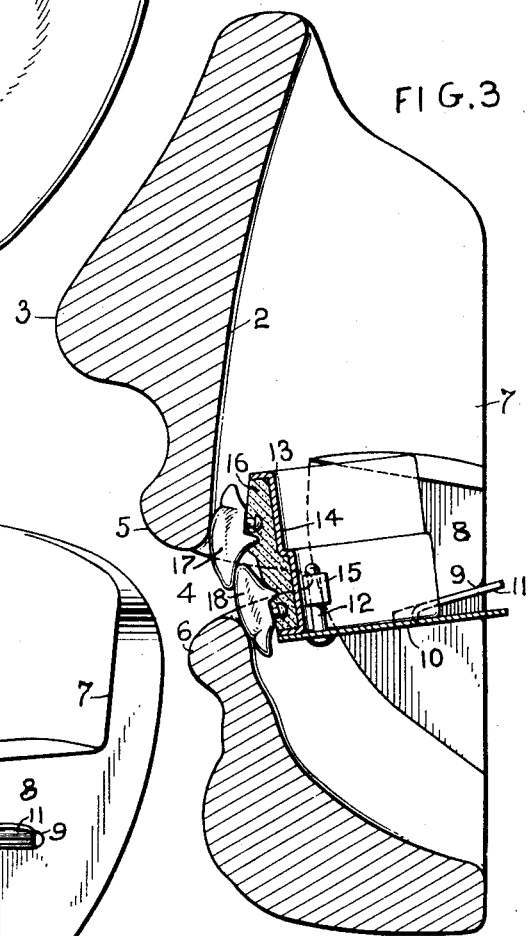
Inventor
Arthur W. Green.
By
Attorney.

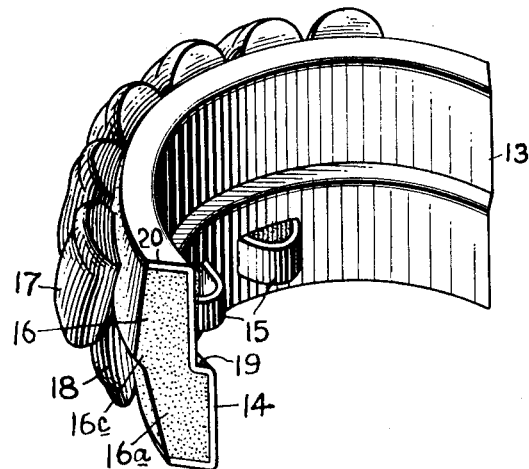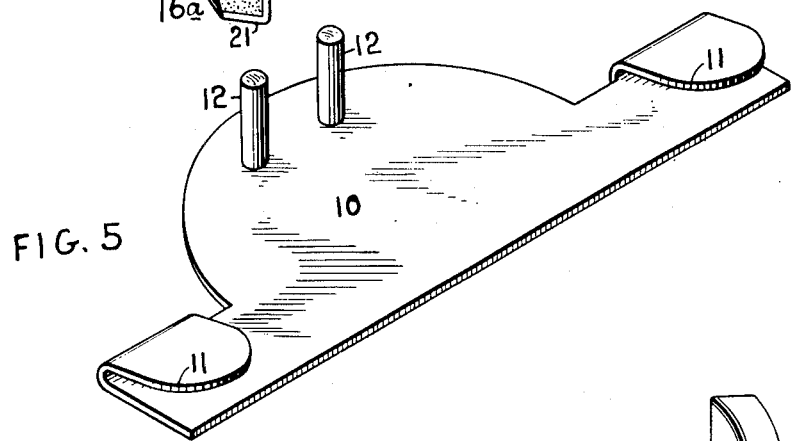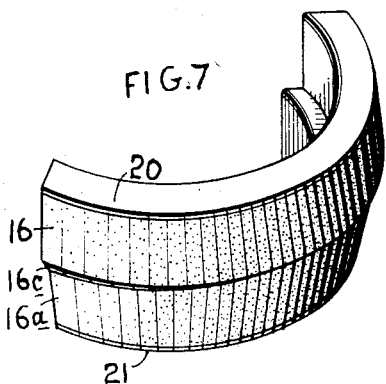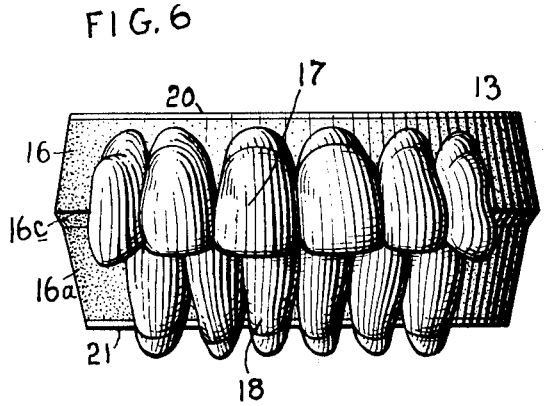

Patented Dec. 5, 1933

1,938,222

UNITED STATES PATENT OFFICE 1,938,222

TOOTH GUIDE

Arthur W. Green, New York, N. Y., assignor to The Dentists' Supply Company of New York, a corporation of New York Application November 22, 1932
Serial No. 643,816

6 Claims. (Cl. 35—16)

The object of my invention is in the nature of an artificial tooth guide which in the hands of a dentist enables him to select the desirable forms of teeth especially suitable to the characteristic features of the patient's head and face and which may, after selection, be positioned in a suitable holder detachably connected with a mask so that the appearance of the teeth in natural position in the mouth portion of the mask gives to the dentist and to the patient also a clearly defined natural impression of what the teeth would be if built up into complete dentures and in the mouth of the patient.

A further object of my invention is to construct the holder for the artificial teeth in a curved form constituting an arc of about 120° and having upper and lower curved surfaces of pliable material to which the upper and lower sets of frontal teeth may be respectively secured and relatively positioned to correspond to the correct relative positions of the teeth as they would appear in the final denture, the said holder being detachably secured to a support which may be held in the hand or positioned to the rear of the mask, as hereinbefore explained, it being understood that the dentist selects the tooth forms which he considers best suitable to the characteristic head and facial contours of the patient and then attaches the said teeth to the pliable surfaces of the holder.

My invention also has a further object in providing a mask with parted lips and a suspension device to the rear of the mask and adjacent to the aperture formed by the lips thereof when associated with detachable holders for the assembled frontal tooth forms, whereby they may be viewed from the front of the mask and whereby also different tooth forms may in proper relative association be successively viewed through the mouth opening of the said mask.

In general, the object of my invention is to set up in physical form frontal teeth more or less resembling dentures with the teeth assembled in proper correlation, but which teeth to be employed are first determined by use of an instrument known as the "Wavrin Trytype Tooth Guide" which is of the general character shown in Letters Patent No. 1,378,745, dated May 27, 1921, and which guide being adjusted to the head of the patient determines the tooth type, tapering, square or ovoid, together with the length and width of the tooth form best suited to the patient, and which are thereafter assembled in the curved holders which are detachably positioned to the rear of the mask structure above referred to.

With the above and other objects in view, the nature of which will be more fully understood from the following specification, the invention consists in the novel features of construction hereinafter more fully described and defined in the claims.

Referring to the drawings: Fig. 1 is a front view of a mask with artificial teeth applied thereto in accordance with my invention; Fig. 2 is a rear view of the improved mask and with the detachable tooth holder support in position; Fig. 3 is a vertical section on line 3—3 of Fig. 1, showing the intimate relation of the artificial teeth in relation to the lip portions of the mask; Fig. 4 is a perspective view of one of the tooth holders with the teeth applied thereto ready to be applied to the mask and support shown in Fig. 2; Fig. 5 is a perspective view of the support for the tooth holders when separated from the mask; Fig. 6 is a front view of the tooth holder and with the teeth applied thereto; and Fig. 7 is a perspective view of the tooth holder before the teeth are applied thereto.

2 represents a mask which may be formed of any suitable material, preferably of plaster, and which for the purpose of my invention may be confined to the lower portion of the face, as indicated in Figs. 1 and 3. The nose structure is indicated at 3 and the aperture between the lips 5 and 6 constitutes the slightly open mouth portion 4 through which the artificial teeth 17 and 18 may be viewed.

At the rear and to each side of the mouth opening 4, the mask is provided with reinforced portions 8, 8, having slots 9, 9, therein for receiving the spring shaped ends 11, 11, of the support 10 whose forward edge is curved to approximately fit to the rear of the mask adjacent to the lip opening 4, the said support plate 10 being provided with upwardly projecting pins 12, 12, by means of which the tooth holder 13 may be detachably secured in position upon the plate and immediately to the rear of the lip opening 4, as shown in Fig. 3. The spring shaped ends 11 snugly fit the rear slits 9 of the mask and provide thereby a reasonable degree of adjustment so as to enable the teeth 17 and 18 to be brought up to approximate contact with the rear lip portions, as also better understood by reference to Fig. 3.

Referring more particularly to the tooth holder 13 shown in Figs. 4, 6 and 7, there is provided a trough-shaped body portion of sheet metal preferably of aluminum curved in arcuate form to the extent of approximately 120°, the said holder provided with an upper flange 20 and lower flange 21, and preferably an intermediate shouldered portion 19 at the rear part 14 of the trough-shaped structure. The groove of the arcuate shaped holder 13 is filled with wax or wax-like material 16 and 16a, the curved wax portion 16 following the curvature of the upper flange 20 and being somewhat conical so as to provide an overhanging portion 16c in respect to the lower curved wax portion 16a. This latter part 16a is also preferably made somewhat conical, but in the opposite direction to that of the part 16. The holder with the wax filling is clearly shown in Fig. 7 to which the teeth have not yet been attached.

In Figs. 3, 4 and 6, the teeth 17 and 18 are shown as positioned upon and attached to the curved wax filling portions 16 and 16a; and moreover as the upper frontal teeth 17 are required to overlap the lower frontal teeth 18, it will be seen that the lower teeth are attached to the curved wax filling 16a while the upper frontal teeth 17 rest upon and are attached to the curved wax filling 16, so that the incisal edges of the said teeth 17 overlap the incisal edges of the lower frontal teeth 18, as is more clearly illustrated in Fig. 3.

The arcuate body portion 13 has its lower rear portion provided with loops 15 pressed up from the sheet metal to form socket portions to receive the pins 12 of the support 10. The connection between the parts 12 and 15 is relatively loose so that the tooth holder 13 may easily fit down upon the pins 12 and rest upon the support 10 adjacent to its front curved edge.

The teeth shown are pin teeth, the pins of which are embedded in the wax of the tooth holder 13 and assist in maintaining the positioning of the teeth upon the wax filling of the trough-like tooth holder.

The utility of my improvements will now be understood by the following procedure: With the use of the "Wavrin Trutype Guide", the proper type of tooth, its length and its width, is determined and thereupon the twelve frontal teeth of the upper and lower jaws are selected together with their color or shade. The lower teeth are first positioned upon and attached to the lower conical filling surface 16a of the tooth holder 13, and thereafter the upper frontal teeth 17 are also determined by use of the "Wavrin Guide" and placed upon the upper conical wax surface 16, and so as to overlap the incisal edges of the lower frontal teeth 18. As these teeth are all positioned on the wax filling of the holder, it is evident that the teeth may be set in any relative alinement or angularity desired to cause them to look natural, and whether they look natural may be determined by placing the tooth holder with the teeth thereon in position upon the support 10 in close relation to the open mouth of the mask, as indicated in Figs. 1 and 3. Several of the tooth holders with different types of teeth and modified relative arrangement may be made up for alternating trial in the mask, with the object in view of the patient securing the most natural type of teeth suitable to the contours of his head and facial characteristics. In this connection it is also desirable that teeth of a shade consistent with the shade and color suitable for the patient may be selected in the trial teeth so that the dentist or laboratory experts may prepare dentures of the character required.

By use of the procedure herein outlined, it is manifest that the dentist and his assistants have every opportunity to build up an illustrative denture including both upper and lower teeth, either or both, which may be supported in a mask and thereby obviate all necessity of treating the teeth or associated means to a sterilizing or other purifying manipulation such as would be required where the experimental or test dentures are made to fit the mouth of the patient, as has heretofore been attempted.

I have described my improved means in that particularity which I deem to be the best exposition of my invention and that which I prefer in commercial practice, but I do not restrict or confine myself to the minor or secondary details, as such are susceptible of modification which may be resorted to as a matter of mechanical skill and without a departure from the spirit of the invention.

I claim:

1. Means for positioning upper and lower sets of frontal teeth of selected size and shape, which consists of a normally rigid tooth holder having upper and lower grooved portions each containing an arcuate channel filled with wax-like material, the lower channel of which is fitted with the lower frontal teeth and the upper channel of which protrudes beyond the lower channel and is fitted with the upper frontal teeth, said teeth and channels being in fixed relation and with the incisal edge of the upper teeth overhanging the incisal edge of the lower teeth.

2. The invention according to claim 1, wherein further, the tooth holder and its associated upper and lower teeth are combined with a common shield having an aperture of less width and height than the space occupied by the teeth whereby the upper and lower portions of the frontal teeth are shielded from view.

3. Means for positioning upper and lower sets of frontal teeth of selected size and shape, which consists of a normally rigid tooth holder having upper and lower portions relatively connected whereby the incisal edges of the upper teeth overlap the incisal edges of the lower teeth, said upper and lower teeth respectively arranged in similar arcuate form, and wherein further, the upper and lower teeth form a unitary structure and associated with a mask having a mouth-like opening and means to temporarily support the unitary tooth structure as a whole in position at the rear of the mask, whereby the teeth may be viewed from the front thereof and through the mouth-like opening.

4. The invention according to claim 1, wherein further, the tooth holder is associated with a mask having a mouth-like opening constituting a mouth piece of lesser area than the frontal teeth and through which the assembled teeth attached to the holder may be viewed through the mask and from the front thereof, and the mask also being provided with a detachable support secured in position at the rear of the mask adjacent to the mouth opening thereof for detachably supporting the tooth holder and its associated upper and lower teeth in position at the immediate rear of the mask, and whereby different set-ups of teeth and their holders may be substituted one for another in an effort to secure tooth forms suitable for the requirements of the patient.

5. The invention according to claim 1, wherein further, the tooth holder is associated with a mask having a mouth-like opening constituting a mouth piece and through which the assembled teeth attached to the holder may be viewed through the mask and from the front thereof, and the mask also being provided with a detachable support secured in position at the rear of the mask adjacent to the mouth opening thereof for supporting the tooth holder and its associated teeth in position at the immediate rear of the mask, and whereby different set-ups of teeth and their holders may be substituted one for another in an effort to secure tooth forms suitable for the requirements of the patient, and wherein further the detachable support consists of a plate having detachable connections with the back of the mask, and means also provided between the said support and the arcuate shaped tooth holder which holds the tooth holder in position at the rear of the mouth portion of the mask.

6. The invention according to claim 1, wherein further, the arcuate upper and lower portions of wax or wax-like substance for simultaneously holding the teeth are made slightly conical, the radial curvature of the upper arcuate portion being greater than the radial curvature of the lower arcuate portion.

ARTHUR W. GREEN.